October 17, 1913.

DRAWING 8,376

A careful search has been made this day for the original drawing or a photolithographic copy of the same, for the purpose of reproducing the said drawing to form a part of this book, but at this time nothing can be found from which a reproduction can be made.

Finis D. Morris,
    Chief of Division E.

AWK

UNITED STATES PATENT OFFICE.

WILLIAM MERRELL, OF RANDOLPH, OHIO.

LATH-MACHINE.

Specification of Letters Patent No. 8,376, dated September 23, 1851.

*To all whom it may concern:*

Be it known that I, WILLIAM MERRELL, of Randolph, in the county of Portage and State of Ohio, have invented certain new and useful Improvements in Machinery for Cutting Lathes or Similar Strips of Wood; and I do hereby declare that the following is a full, clear, and exact description of the same, reference being had to the accompanying drawings, forming part of this specification, in which—

Figure 1, is a front elevation. Fig. 2 is a plan. Fig. 3 is a transverse vertical section through the center, seen looking from the right hand of Fig. 1. Fig. 4, is a detached view showing the saw and the cutter for cutting the edge of the lath in perspective.

Similar letters of reference indicate corresponding parts in each of the several figures.

The nature of my invention consists in a long horizontal frame of suitable form, having a rotary saw hung upon a spindle placed transversely upon it near its center; upon the top of the front part of the frame a suitable table or bed is provided for the purpose of receiving the slab or stuff from which the laths are to be cut which is fed to the saw by feed rollers, near the top end of the frame is a contrivance (to be herein after described) for throwing out each lath immediately after it is cut off, and throwing down the slab or stuff to a series of rollers which return it to the bottom end of the frame, where the attendant stands to receive it and place it again on the table for another cut; the saw has a cutter attached to and rotating with it, for the purpose of planing or giving any required bevel or form to the edge of the lath at the same time that it is being cut off.

To enable others skilled in the art to make and use my invention, I will proceed to describe fully its construction and operation.

A, A, A, (Figs. 1, 2, and 3) represents a frame of timber of suitable strength to support the working parts of the machinery.

B, is the saw spindle, which is mounted in suitable journal boxes ($a$,) ($a$,) on the frame, near the middle of its length; it carries the circular saw ($b$,) and a circular cutter ($c$,) secured upon the spindle close to the saw (see Figs. 2 and 3,) for cutting or planing a bevel or other form on the edge of the lath while it is being sawn; it also carries a pulley $d$ motion to which is given by a band passing around the driving pulley C; and having upon the same shaft B another pulley $e$.

E is that portion of the table on which the slab or stuff is placed for cutting and is provided with gages $f\,f$ upon its face which can be set to regulate the thickness of the lath.

$E^2$ is that portion of the table on which I base my claim for improvement, and is placed at the rear of the saw $b$; instead of being constructed with a flat surface, it is rounded toward the outer edge, thus facilitating in the simplest manner the delivery of the slab upon the return rollers G G.

F F F F Fig. 1, are two pair of feed rollers firmly secured on shafts $g\,g\,g'\,g'$ which are mounted on bearings or standards bolted to the frame the shafts are set slightly out of line with the saw spindle, and therefore at an angle slightly deviating from a right line with the faces of the gages $f\,f$ see Fig. 2. This causes the rollers while feeding to draw the stuff close to the gage; the shaft of the upper roller of each pair carries a pulley $h$ for receiving a rotary motion, and each pair are geared together by a pair of toothed wheels ($i\,i$).

J is a thin strip of metal extending along the edge and rising above an opening in the table $E^2$ forming a groove under which passes the revolving belt ($p$) intended to receive the sawed lath after it is thus directed by said strip J, which separates it from the slab; said slab is directed by the curved end of J represented in Fig. 2, at the letter $k$ and thus, in conjunction with the rounded form of the table $E^2$ adverted to; throws the slab on the rollers G G by which it is again returned to the attendant; while the lath passes under the grooved wheel $o$ and is registered, this grooved wheel $o$, regulated by a spring, on the passing of the lath, permits it to be dropped in a cross frame in bundles of 100 ready for typing up. G, G, G, Figs. 1, 2 and 3, are a series of rollers mounted on spindles $l\,l\,l$ which are hung at convenient distances apart in bearings in bars H H extending along the front part of the frame below the table E and $E^2$, each spindle $l$ carries a pulley $m$ Fig. 3, and in dotted lines Fig. 1, and a band ($n$) passes around all the pulleys; the first spindle $l$ is continued across the frame and carries a large pulley I which receives motion through a band $o$, from the pulley $e$, on the saw spindle, this band gives motion to the rollers so as to cause their upper sides to move in the direction of the arrow shown in Fig. 2; these rollers form a returning table for carrying back the stuff to the operator.

K, K, K, Figs. 1 and 2 are a series of rollers hung on axes below that part of the bed E², between the strip J, and the gage, the part of the bed above them being cut away; forming a groove a band (p,) passes around them, and its face runs level with the bed, this band receives motion by bearing on the band n, which drives the rollers G, G, G; the rollers K, K, K, and G G G, rotate in opposite directions.

L, is a shaft hung in bearings in the lower part of the frame below the saw spindle it carries a large pulley M, and a small pulley (N,) the large pulley M, receives motion by a band (q,) from a small pulley on the first spindle l, and transmits it through the small pulley N, and bands (r, r,) to the pulleys h, h, on the feed roller shafts.

o, is a grooved wheel hung on a shaft placed at the upper end of the bench and held down by a spring (s,) it is raised, by each lath as it leaves the frame, passing under it; attached to the shaft is a clich (b,) which gears into a ratchet wheel u, hung on a spindle under the end of the frame, and having one hundred (100) or more teeth according to the number of laths it is desired to put in a bundle, this ratchet wheel is moved one tooth every time the wheel O, is raised by a lath passing under it; on the back of the ratchet is a cam, on which bears the spring arm of a hammer (v,) the ratchet being set in a proper position before the work is commenced, as soon as it has made a revolution the cam arrives at a point which causes the hammer to fall and strike a bell P, announcing to the attendant that the proper number of laths for a bundle have been cut, and are ready for being tied up.

The operation is as follows. Rotary motion given to the shaft B' will set the several parts of the machine in motion by means of the bands and pulleys and gearing as before described.

The slab or stuff from which the lath is to be cut (represented by red lines in (Figs. 1, and 2,) placed by the operator on the bed E, at the right hand end of the frame; the end of the stuff being placed between the feed rollers E, E, Fig. 1 it is drawn forward to the saw, and the lath is cut off, the lower edge being planed by the cutter c, to give it the required width (this is sometimes necessary owing to the slab being rough and uneven) or to give a bevel to the edge, the stuff continues to be drawn forward through the feed rollers F', F', until it is clear of the saw and feed rollers; the lath is then on the band p, which being moved at a tolerably quick speed carries it along under the wheel o, raising the wheel and giving rotary motion to it, as it passes between the last roller K, and the wheel o, the spring (s,) draws down the wheel o, over the end of the lath and throws it out over the end of the frame; in the mean time the stuff after being released from the feed rollers falls over the rounded edge of the table E², (or if sufficiently long to find a bearing on the table beyond where it is rounded on the edge is thrown off by the incline piece k,) and is caught upon the rollers G, G, G, which being in constant motion carry it back to the end of the frame, where the operator stands ready to receive it, and place it on the table, where the operation will be repeated as above described.

Having thus fully described my invention for sawing laths, I desire it to be understood that I do not claim mounting a rotary cutter c, on the same spindle of the rotary saw as herein described. Nor do I claim the returning table consisting of a series of rollers g, g, g, arranged and operated in the manner described. But

What I do claim and desire to secure by Letters Patent, is—

1. The director J, and carrying belt, in combination with the apparatus for registering, substantially such as described, for delivering bundles ready counted.

2. I also claim the rounded surface of the receiving table in conjunction with the bent form of the strip J, as represented in Fig. 2, at (k) which effects in the simplest manner the delivery, on the returning rollers G, G, G, of the unsawed slab to the attendant for another cut.

In testimony whereof I have hereunto signed my name before two subscribing witnesses.

WILLIAM MERRELL.

Witnesses:
JOHN F. CLARK,
COVILLE LEE.